United States Patent [19]

Birch

[11] Patent Number: 5,161,992
[45] Date of Patent: Nov. 10, 1992

[54] ELECTRICAL CONNECTOR ASSEMBLY FOR A CARD CONTAINING AN INTEGRATED CIRCUIT CHIP

[75] Inventor: Norman R. Birch, Jacobus, Pa.
[73] Assignee: AMP Incorporated, Harrisburg, Pa.
[21] Appl. No.: 822,249
[22] Filed: Jan. 17, 1992
[51] Int. Cl.$^5$ ............................................ H01R 12/15
[52] U.S. Cl. ..................................... 439/260; 439/267
[58] Field of Search ............... 439/259, 260, 261, 262, 439/265, 267, 635, 341

[56] References Cited

U.S. PATENT DOCUMENTS

| | | | |
|---|---|---|---|
| 4,236,667 | 12/1980 | Crowley et al. | 439/260 |
| 4,592,608 | 6/1986 | Ohtsuka et al. | 339/42 |
| 4,735,578 | 4/1988 | Reichardt et al. | 439/152 |
| 4,795,897 | 1/1989 | Chalendard | 439/260 |
| 4,810,203 | 3/1989 | Komatsu | 439/326 |
| 4,839,509 | 6/1989 | Yasuma et al. | 235/482 |
| 4,874,323 | 10/1989 | Shibano | 439/260 |
| 4,940,418 | 7/1990 | Shimizu et al. | 439/260 |
| 4,961,710 | 10/1990 | Komatsu | 439/267 |

Primary Examiner—Larry I. Schwartz
Assistant Examiner—Hein D. Vu

[57] ABSTRACT

A connector assembly (16) for a memory card (10) includes a frame (24) and a contact-carrying carriage member (30) pivotally mounted to the frame. Guide rails (26, 28) are formed integrally with the frame and extend away from the frame. A first of the guide rails (26) is, together with t he frame, securely mounted to support structure, while the other guide rail (28) is free to flex relative to the frame. Insertion of the card causes the carriage member to be pivoted, against the biasing action of a spring 984), so that the contact members (60) engage respective contact pads (14) on the card. The guide rails are spring loaded toward each other to generate a friction force against the opposed edges (20, 22) of the card which is sufficient to overcome the biasing force of the spring (84) on the carriage member, thereby retaining the card in the connector assembly.

16 Claims, 6 Drawing Sheets

ELECTRICAL CONNECTOR ASSEMBLY FOR A CARD CONTAINING AN INTEGRATED CIRCUIT CHIP

BACKGROUND OF THE INVENTION

This invention relates to electrical connector assemblies and, more particularly, to such an assembly for receiving a card containing an integrated circuit chip and providing electrical connections to contact pads for the chip which are arrayed on the surface of the card.

In recent years, there has been increased interest in, and use of, what are colloquially termed "smart cards". Such cards are the size and shape of, and look like, standard plastic credit cards but also have imbedded therein an integrated circuit chip. The chip is typically a memory chip or may be a micro processing chip, which stores information such as, for example, the amount of money remaining in a deposit account of the type used for paying public transit fares. In the following discussion, the term "memory card" will be deemed to include such an integrated circuit chip. To provide access to the information stored in the chip, the chip is connected to contact pads which are arrayed on the surface of the card. It is therefore a primary object of this invention to provide a connector assembly for effecting electrical connections to the contact pads to allow the memory information in the chip contained within the card to be read and/or updated.

Typically, a "reader" for such a smart card is contained within a housing having a slot through which the card is inserted and removed. The user positions the card in a predetermined orientation and inserts the card into the slot. The card is manipulated so that it becomes fully seated in the reader where appropriate electrical connections are made to the contact pads on the surface of the card. It is therefore another object of this invention to provide a connector assembly of the type described wherein the card is easily guided to its fully seated position.

The card must then remain fully seated with the connections being operative for a sufficient amount of time that the information in the chip may be read and/or updated. It is therefore a further object of this invention to provide an assembly of the type described wherein the card is retained in its fully seated position until such time as the user manually removes it.

It is still another object of this invention to provide such an assembly which includes an arrangement for detecting when the card is in its fully seated position.

It is still a further object of this invention to provide such an assembly wherein adequate and substantially equal contact forces are generated between contact members of the connector assembly and the contact pads on the card.

SUMMARY OF THE INVENTION

The foregoing, and additional, objects are attained in accordance with the principles of this invention by providing a connector assembly for effecting electrical connections to an array of contact pads on a surface of a substantially planar and rectilinear card insertable into the connector assembly in a predetermined direction parallel to the plane of the card and a pair of opposed edges of the card. The connector assembly comprises a frame, means secured to the frame for guiding the card for movement in the predetermined direction toward the frame, a carriage member, and means for mounting the carriage member to the frame for pivoting movement about an axis which is parallel to the plane of the card and transverse to the predetermined direction of movement of the card. A plurality of contact members are mounted to, and extend away from, the carriage member so that when a card is inserted in the connector assembly and the carriage member is pivoted in a first direction each of the contact members engages a respective one of the contact pads on the card. The connector assembly also includes means for yieldably biasing the carriage member to pivot in a second direction opposite the first direction. Pivot means are provided which are activated by the card to cause the carriage member to pivot in the first direction as the card is moved along the guiding means in the predetermined direction.

BRIEF DESCRIPTION OF THE DRAWING

The foregoing will be more readily apparent upon reading the following description in conjunction with the drawings in which like elements in different figures thereof have the same reference numeral and wherein.

DETAILED DESCRIPTION

Figure 1:
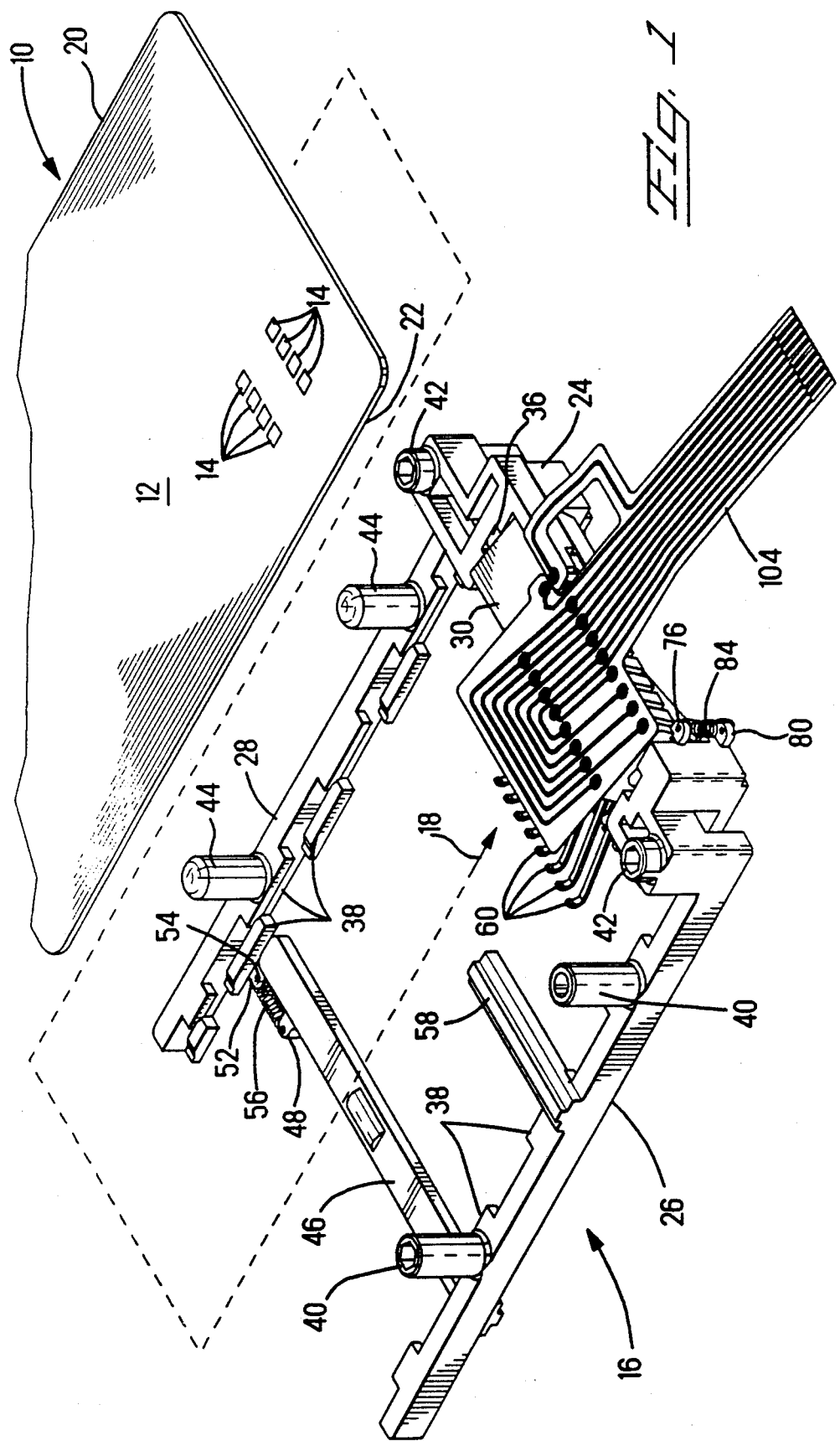
FIG. 1 is a perspective view of a memory card and an illustrative electrical connector assembly constructed in accordance with the principles of this invention.

Referring now to the drawings, FIG. 1 shows a memory card 10 in which there is imbedded an integrated circuit chip (not shown). The card 10 is substantially planar and of rectilinear shape and has on its surface 12 an array of contact pads 14 which are connected to the imbedded chip. The dimensions of the card 10 and the placement of the array of contact pads 14 on the surface 12 follows an international standard and therefore an electrical connector assembly for a reader of the card 10 must be designed so that it can accept any card conforming to that standard and provide electrical connections to the array 14. The details of construction of the memory card 10 are well known and form no part of the present invention. Typically, the size and shape of the memory card 10 are the same as that of an ordinary plastic credit card.

The drawings also illustrate an electrical connector assembly designated generally by the reference numeral 16 and constructed in accordance with the principles of this invention. The card 10 is insertable into the connector assembly 16 in a predetermined direction, shown by the arrow 18, which direction is parallel to the plane of the card 10 and also parallel to a pair of opposed edges 20, 22 of the card 10. The assembly 16 includes, as its major components, a frame 24, a pair of guide rails 26, 28 and a carriage member 30. The carriage member 30 is mounted to the frame 24 for pivoting movement about an axis which is parallel to the plane of the card 10 and transverse to the direction of movement 18 of the card 10. As is most clear from FIG. 2, this mounting is illustratively effected by providing a through-bore 32 in the carriage member 30 which extends along the desired pivot axis of the carriage member 30. A pivot pin 34 is inserted into the through-bore 32. The length of the pivot pin 34 is slightly greater than the length of the carriage member 30 along the pivot axis and therefore the pivot pin 34 extends outwardly from the through-bore 32 at both ends thereof. These ends of the pivot pin 34 are inserted into sockets 36 provided in the frame 24, illustratively in a snap fit manner.

Figure 4:
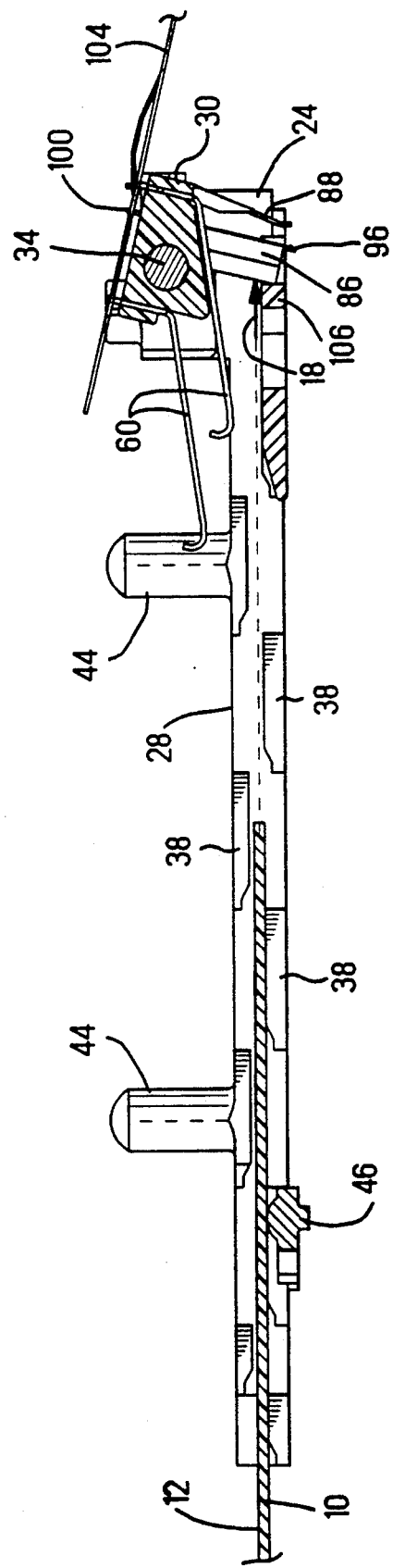
FIG. 4 is a cross sectional view of the inventive connector assembly of FIG. 1 showing the memory card partially inserted.

The guide rails 26, 28, along with the frame 24, are preferably part of a unitary molded plastic piece. The guide rails 26, 28 extend substantially parallel to each other and away from the frame 24, and each includes a channel for a respective one of the opposed edges 20, 22 of the card 10. Illustratively, each of these channels is formed by a respective plurality of projections 38. The projections 38 are in staggered arrays along the guide rails 26, 28 and, as best shown in FIG. 4, are spaced, top to bottom, by slightly more than the thickness of the card 10, with the leading edges of the projections 38 being beveled so that the leading edge of the card 10 easily passes thereby when being inserted into the assembly 16.

As was previously mentioned, the guide rails 26, 28 preferably are formed integrally with the frame 24. Accordingly, the rails 26, 28 are flexible relative to the frame 24. However, in accordance with this invention, only the guide rail 28 is allowed to flex. Thus, the guide rail 26 is formed with upstanding mounting posts 40 and the frame 24 is formed with upstanding mounting posts 42. The mounting posts 40, 42 are formed with central counterbores and are of such height that their upper surfaces lie in a single plane. The mounting posts 40, 42 are adapted to abut against the lower surface of a rigid circuit board (not shown), with their counterbores receiving threaded screws to attach them to the circuit board. Since the rail 26 is thus fixed with respect to the frame 24 when the connector assembly 16 is mounted to the circuit board, the rail 26 cannot flex with respect to the frame 24. However, the rail 28 is formed with upstanding posts 44 which ride against the undersurface of the circuit board, so that the rail 28 is still flexible relative to the frame 24. It is understood that support structure other than a circuit board may be provided.

To control the flexing of the rail 28, for reasons to be described in full detail hereinafter, there is provided a cross bar 46 formed integrally with the rail 26 and extending toward the rail 28. (It is understood that the bar 46 could, as an alternative, be integral with the rail 28 and extend toward the rail 26.) At the distal end of the bar 46 there is formed a projection 48 with a bore 50 therethrough. In close proximity to the projection 48, the rail 28 is formed with a similar projection 52 having a bore 54. A helical extension spring 56 is provided, the end tangs of which are inserted into the bores 50, 54. Thus, the spring 56 pulls the rail 28 toward the rail 26, this pulling being limited by the distal end of the bar 46 abutting against a lower one of the projections 38. The length of the bar 46 is chosen so that when its distal end abuts against that one of the projections 38, the distance between the guide rails 26, 28 at the entry end of the connector assembly 16 opposite the frame 24 is slightly less than the width of the card 10 between its opposed edges 20, 22. However, since the card 10 has rounded corners, when it is inserted in the guide channels at that open end, the rounded corners provide a camming action to spread the rails 26, 28 by flexing the rail 28 so that the force exerted by the spring 56 is overcome. However, as will be described hereinafter, the spring 56 is chosen so that a substantial friction force is exerted on the opposed edges 20, 22 of the card 10.

It is noted that the bar 46 is on the lower side of the connector assembly 16 and will be below the card 10 when the card is inserted into the assembly 16. There is also provided a bar 58 which is integral with the guide rail 26 and extends toward the guide rail 28 above the card 10. Thus, flexing of the card 10 is limited by the bars 46 and 58.

To provide electrical connections to the contact pads 14 of the card 10, the connector assembly 16 is provided with a plurality of contact members 60 mounted to the carriage member 30. Preferably, the contact members 60 are identical. Illustratively, each of the contact members 60 is formed from resilient sheet stock material and includes an elongated beam portion 62 terminated at one end by a curved contact portion 64 and at its other end by an attachment portion 66 which is bent with respect to the beam portion 62. The carriage member 30 is formed with an array of channels 68 adapted to receive the attachment portions 66 of the contact members 60. The attachment portions 66 are preferably of an arrowhead-type shape so that they can be inserted into the channels 68 but not removed therefrom. Each attachment portion 66 is also formed with a small connection post 70 which extends out of the channel 68 beyond the top surface of the carriage member 30. As is shown in the drawings, the channels 68 are arrayed along both the front face 72 and the rear face 74 of the carriage member 30. There are thus two rows of contact members 60 which have their beam portions 62 substantially parallel to each other and extending toward where the card 10 enters the assembly 16, with the contact portions 64 of all of the contact members 60 being on the same side of the plane of the card 10 as is the pivot pin 34.

Figure 5:
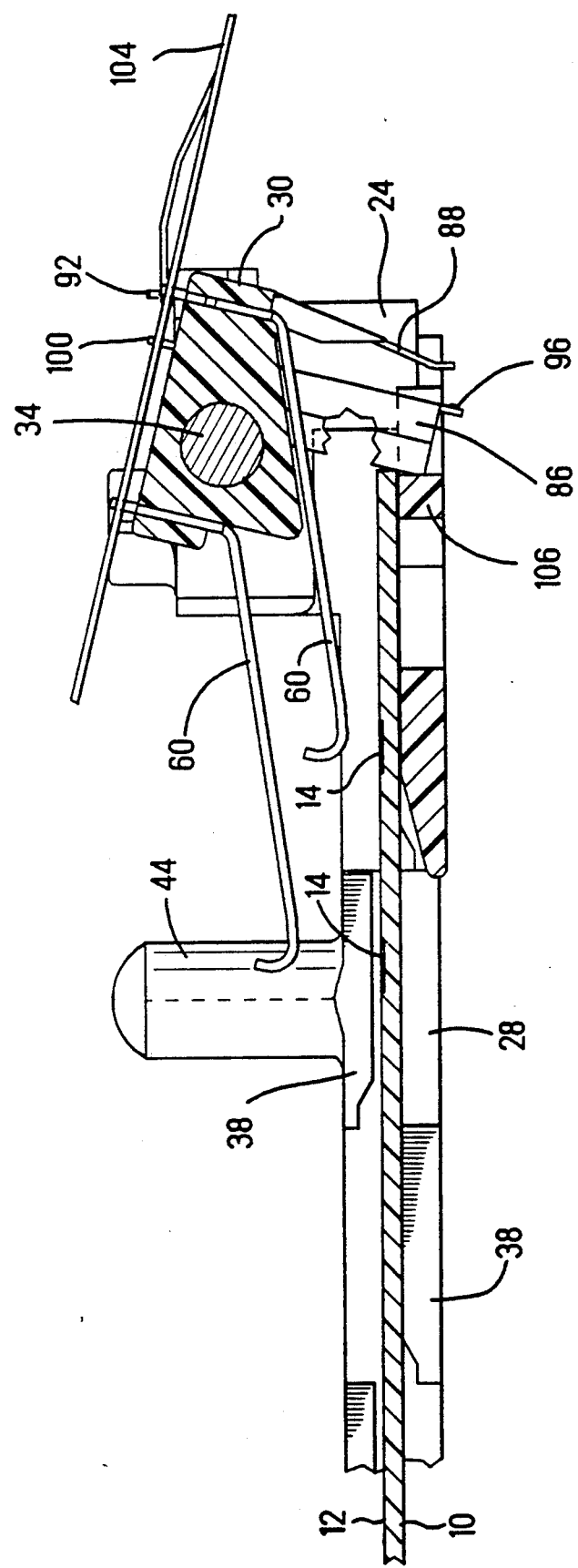
FIG. 5 is an enlarged partial cross sectional view of the inventive connector assembly showing the memory card just before it is in its fully seated position.
Figure 6:
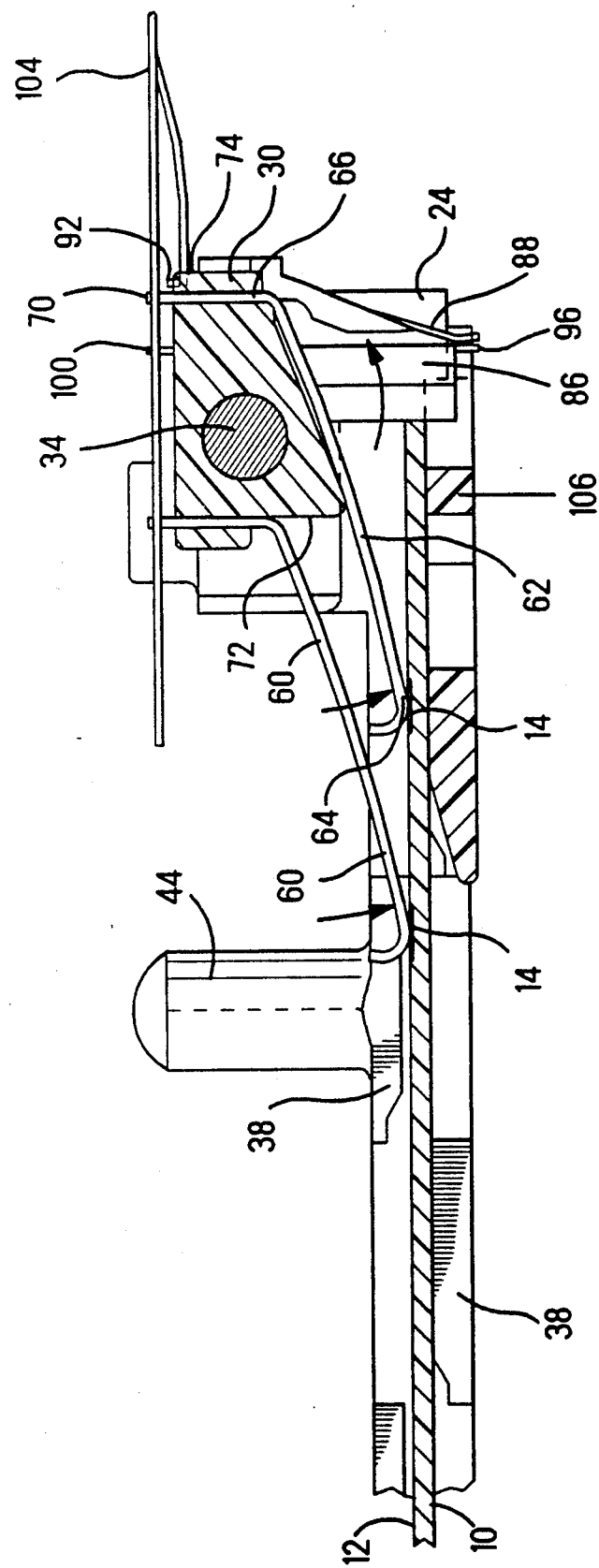
FIG. 6 is a view similar to FIG. 5 showing the memory card in its fully seated position.

To keep the contact members 60 from interfering with insertion of the card 10 into the connector assembly 16, the carriage member 30 is biased in a clockwise direction, as viewed in FIGS. 4–6. This biasing action is effected by providing a projection 76 having a bore 78 on the carriage member 30 and a projection 80 having a bore 82 on the frame 24. A helical extension spring 84 is provided which has its end tangs inserted into the bores 78 and 82. Thus, the spring 84 yieldably biases the carriage member 30 so that the contact members 60 are above the card 10. However, when the card 10 is inserted into the connector assembly 16, it is desired that at some point in the travel of the card 10, the carriage member 30 be pivoted in a counterclockwise direction, as viewed in FIGS. 4–6, so that the contact portions 64 of the contact members 60 engage the contact pads 14. Therefore, the carriage member 30 is formed with a downwardly depending rigid abutment member 86 which extends across the path of travel of the card 10, as is clearly shown in FIGS. 4–6, for pivoting the carriage member 30 upon insertion of the card 10.

Figure 2:
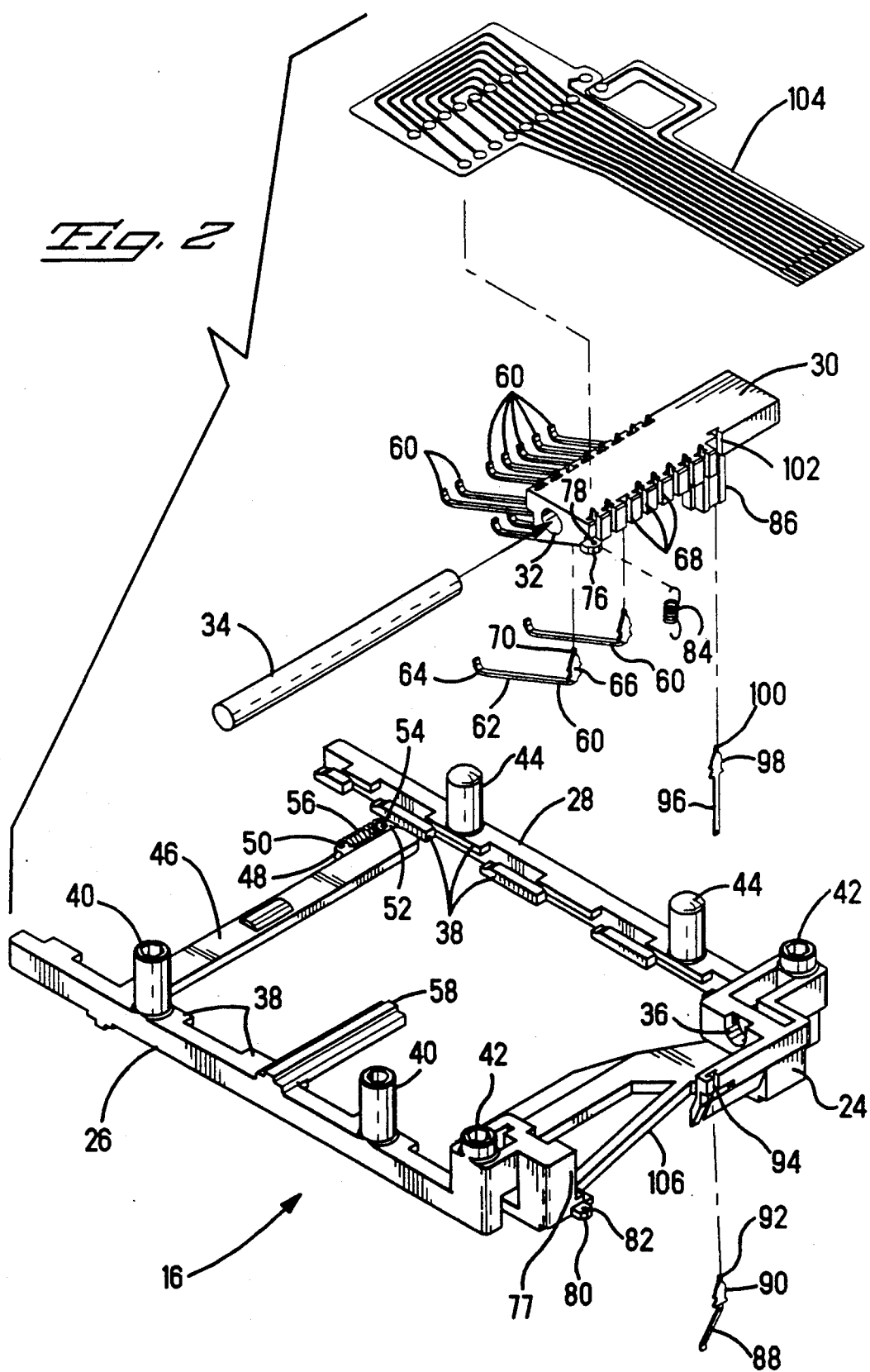
FIG. 2 is an exploded perspective view of the connector assembly of FIG. 1.
Figure 3:
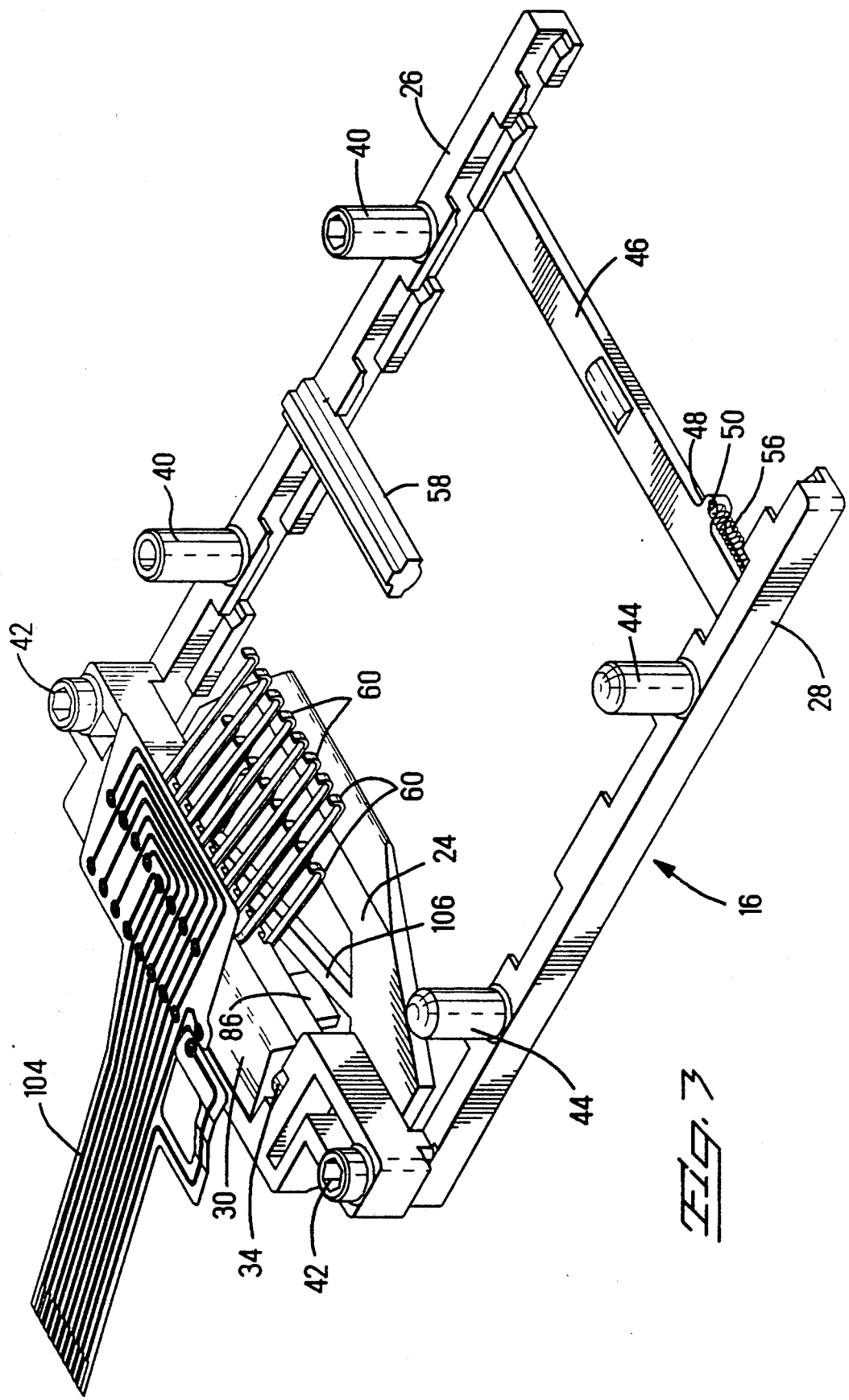
FIG. 3 is another perspective view of the connector assembly of FIG. 1 when viewed in the opposite direction from that of FIG. 1.

In accordance with this invention, two further contacts are provided. These contacts are for the purpose of detecting when the card 10 is fully inserted into the connector assembly 16. The first detecting contact 88 is mounted to the frame 24. As shown in FIG. 2, the contact 88 includes an attachment portion 90 terminated by a connection post 92 and is installed in an appropriate channel 94 formed in the frame 24, and is biased toward the bar 46 so that the contact 88 is preloaded. The second detecting contact 96 is mounted to the carriage member 30. As shown in FIG. 2, the contact 96 includes an attachment portion 98 terminated by a connection post 100 and is installed in an appropriate channel 102 formed in the carriage member 30 directly above the abutment member 86. Thus, the second detecting contact 96, when installed, rests against the abutment member 86. This insures that when the carriage member 30 is pivoted counterclockwise, the second detecting contact 96 is likewise forced in that direction.

There is further provided a flat flexible cable 104 which provides connections to all of the connection posts 70, 92 and 100 for subsequent connection to appropriate circuitry (not shown).

In operation, the card 10 is inserted into the connector assembly 16 at the open end away from the frame 24. Since the spring 56 acts to close off that open end, to the extent allowed by the bar 46, this open end is slightly smaller in dimension than the width of the card 10 between its opposed edges 20, 22. However, the spacing between the guide rails 26, 28 must be sufficient to allow insertion of part of the rounded corners at the leading edge of the card 10. Accordingly, the rounded corners of the leading edge of the card 10 provide a camming action to move the guide rail 28 against the force of the spring 56 and away from the fixed guide rail 26. The card 10 is then moved further into the connector assembly 16. This movement is resisted by friction exerted on the opposed edges 20, 22 by the guide rails 26, 28, under the influence of the spring 56. However, this friction force, while being significant, is readily overcome by the user pushing the card 10 into the assembly 16.

FIG. 5 illustrates the operation of the connector assembly 16 when the leading edge of the card 10 initially engages the abutment member 86 of the carriage member 30. It will be recalled that the carriage member 30 had been pivoted in a clockwise direction due to the action of the spring 84. Travel in that clockwise direction is limited, however, by the projection 76 abuttingly engaging the surface 77 of the frame 24. At this time, all of the contact members 60 are above the card 10 and out of engagement with the contact pads 14. Upon continued insertion of the card 10, the leading edge of the card 10 engages and displaces the abutment member 86. The carriage member 30 is therefore pivoted counterclockwise against the biasing force of the spring 84, as shown in FIG. 6. The contact members 60 drop down and their contact portions 64 engage respective ones of the contact pads 14 after the carriage member 30 has pivoted at least some minimum distance. This occurs while the card 10 still has approximately 20 mils of travel before it is fully seated in the contact assembly 16, so that a wiping action between the contact portions 64 and the contact pads 14 takes place. Insertion of the card 10 continues until the second detecting contact 96 mounted to the carriage member 30 touches the first detecting contact 88 mounted to the frame 24. Due to the second detecting contact 96 resting against the abutment member 86, positive engagement with the first detecting contact 88 is assured. At this time, the card 10 is fully seated within the connector assembly 16 and the contact members 60 all engage their respective contact pads 14. Since the contact 88 has been preloaded as set forth above, when the contact 96 mates with the contact 88, the proper contact force is automatically established.

If the user releases the card 10, the biasing force of the spring 84 attempts to pivot the carriage member 30 in a clockwise direction so as to eject the card 10 from the connector assembly 16. However, the spring 56 is chosen so that it is sufficiently strong that the friction force exerted on the opposed edges 20, 22 of the card 10 is greater than the ejection force exerted on the card 10 by the combined normal force of the contact members 60, the spring 84, and the springback of the contact 88. Accordingly, once the card 10 is fully seated within the connector assembly 16, it will remain there until it is pulled out by the user.

It is noted that there are two rows of contact members 60. It will also be appreciated that the contact members 60 in the row mounted to the rear face 74 of the carriage member 30 engage their respective contact pads 14 before the contact members 60 in the row mounted to the front face 72 of the carriage member 30 engage their respective contact pads 14. However, the effective radii of the contact portions 64 about the pivot pin 34 are chosen so that substantially equal contact forces are generated when the card 10 is fully seated in the connector assembly 16.

As shown in FIG. 1, the array of contact pads 14 is a two by four array, whereas the contact members 60 form a two by eight array. The reason for this is that there are two standards to which the cards 10 may conform. Each of these standards involves a two by four array of contact pads, but the arrays are offset relative to each other across the width of the card 10. Therefore, the connector assembly 16 has been designed to accommodate cards conforming to both standards.

Accordingly, there has been disclosed a connector assembly for effecting electrical connections to contact pads on the surface of a card containing an integrated circuit chip. While a preferred embodiment has been disclosed herein, it will be apparent to those skilled in the art that various modifications and adaptations to the disclosed embodiment are possible, and it is intended that this invention be limited only by the scope of the appended claims.

An important advantage of the present invention is that a positive wiping action necessary for good reliable electrical contact is provided without excessive wiping that would tend to adversely erode the contact plating as well as the contact pads of the card.

I claim:

1. A connector assembly (16) for providing electrical connections to an array of contact pads (14) on a surface (12) of a substantially planar and rectilinear card (10) insertable into the connector assembly in a predetermined direction (18) which is parallel to the plane of said card and a pair of opposed edges (20, 22) of said card, the assembly comprising:

a frame (24);

means (26, 28) secured to said frame for guiding said card for movement in said predetermined direction toward said frame;

a carriage member (30);

means (34, 36) for mounting said carriage member to said frame for pivoting movement about an axis which is parallel to the plane of said card and transverse to the predetermined direction of movement of said card;

a plurality of contact members (60) mounted to and extending away from said carriage member so that when said card is inserted in the connector assembly and said carriage member is pivoted in a first direction each of said contact members engages a respective one of said contact pads on said card;

means (84) for yieldably biasing said carriage member to pivot in a second direction opposite said first direction;

pivot means (86) activated by said card for causing said carriage member to pivot in said first direction as said card is moved along said guiding means in said predetermined direction; and means (56) cooperating with said guiding means (26, 28) for resisting movement of said card (10) in a direction opposite said predetermined direction (18), said resisting means acting to apply a resisting force to said card which is greater than the force applied by said biasing means (84) to said carriage member (30), so that after said carriage member is pivoted in said first direction due to insertion of said card in said connector assembly, said contact members (60) remain in engagement with the respective contact pads (14) on said card.

2. The assembly according to claim 1 wherein said biasing means includes a spring (84) connected between said carriage member and said frame.

3. The assembly according to claim 1 wherein said pivot means includes a rigid abutment member (86) secured to said carriage member (30) and extending across the path of travel of said card for engagement by said card.

4. The assembly according to claim 1 wherein said guiding means includes a pair of guide rails (26, 28) extending substantially parallel to each other and away from said frame (24), each of said guide rails including a channel for a respective one of said opposed edges (20, 22) of said card, and said resisting means includes means (56) for resiliently forcing said guide rails toward each other so as to clamp said card between said guide rails and provide said resisting force in the form of a friction force.

5. The assembly according to claim 4 wherein said frame (24) and a first of said guide rails (26) are provided with means (40, 42) for securely mounting said frame and said first guide rail to support structure and the other of said guide rails (28) is flexible relative to said frame.

6. The assembly according to claim 4 wherein said resisting means comprises a spring (56) connected between said guide rails (26, 28).

7. The assembly according to claim 6 wherein said resisting means further comprises means (46) for limiting movement of said guide rails (26, 28) toward each other.

8. The assembly according to claim 7 wherein said limiting means includes a bar member (46) mounted to one of said guide rails (26) and extending toward the other of said guide rails (28) and abutment means (38) mounted to said other guide rail (28) in interfering relation with the distal end of said bar member (46).

9. The assembly according to claim 8 wherein said spring (56) extends from said bar member (46) to the other of said guide rails (28).

10. The assembly according to claim 8 wherein said bar member (46) is on a first side of the plane of said card and further including a second bar member (58) mounted to said one guide rail (26) and extending toward the other of said guide rails (28), said second bar member being on the other side of the plane of said card.

11. The assembly according to claim 1 further including means (88, 96) for detecting when said card is fully inserted in said connector assembly.

12. The assembly according to claim 11 wherein said detecting means includes:

a first detecting contact (88) mounted to said frame; and a second detecting contact (96) mounted to said carriage member (30) in such a position that when said carriage member is pivoted in said second direction by said biasing means in the absence of said card (10), said second detecting contact is out of engagement with said first detecting contact and when said carriage member is pivoted in said first direction by the action of said card being moved along said guiding means in said predetermined direction, said second detecting contact engages said first detecting contact after said plurality of contact members (60) engage respective ones of said contact pads (14) on said card.

13. The assembly according to claim 12 wherein said pivot means includes a rigid abutment member (86) secured to said carriage member (30) and extending across the path of travel of said card (10) for engagement by said card and said second detecting contact (96) rests against said abutment member.

14. The assembly according to claim 1 wherein said plurality of contact members (60) extend parallel to each other away from said carriage member (30) and toward where the card (10) enters the connector assembly (16), said contact members being on the same side of the plane of said card as said pivot axis of said carriage member, said contact members being spaced from said card until said carriage member is pivoted at least a minimum distance in said first direction.

15. The assembly according to claim 14 wherein said plurality of contact members (60) are so mounted on said carriage member (30) that they engage their respective contact pads (14) on said card (10) before said card is fully inserted in the connector assembly (16), whereby a wiping action between said contact members and said contact pads is effected.

16. The assembly according to claim 14 wherein said plurality of contact members (60) are divided into a first group and a second group, said first group of contact members being mounted on a first side (72) of said carriage member (30) and said second group of contact members being mounted on a second side (74) of said carriage member (30) across said pivot axis from said first side, said first group of contact members lying substantially in a first plane, said second group of contact members lying substantially in a second plane, the distal ends of the first group of contact members being at a first distance from said pivot axis and the distal ends of the second group of contact members being at a second distance from said pivot axis, said first and second groups of contact members being so mounted on said carriage member that the distal ends of said second group of contact members engage their respective contact pads on said card before the distal ends of said first group of contact members engage their respective contact pads on said card, said second distance being less than said first distance and said first and second distances being selected so that the contact forces between all of said contact members and their respective contact pads on said card are substantially equal when said card is fully inserted in the connector assembly.

* * * * *